United States Patent [19]

Musha et al.

[11] 4,425,636
[45] Jan. 10, 1984

[54] METHOD AND APPARATUS FOR REPRODUCING OPTICALLY AN INFORMATION RECORDED ON A RECORD MEDIUM ALONG TRACKS

[75] Inventors: Tohru Musha; Kiichi Kato; Kenichi Ito, all of Hachioji, Japan

[73] Assignee: Olympus Optical Co. Ltd., Japan

[21] Appl. No.: 301,092

[22] Filed: Sep. 10, 1981

[30] Foreign Application Priority Data

Sep. 12, 1980 [JP] Japan .................. 55-126964

[51] Int. Cl.³ .................... G11B 7/00; G11B 21/02
[52] U.S. Cl. ................................ 369/44; 369/45; 358/342; 250/201
[58] Field of Search ............. 369/44, 45, 46, 109, 369/111; 358/342, 347, 348; 356/123; 350/46; 250/204, 201; 354/25

[56] References Cited

U.S. PATENT DOCUMENTS 4,085,423 4/1978 Tsunoda et al. ................ 369/46 X
4,302,830 11/1981 Hamaoka et al. .................. 369/45

Primary Examiner—Robert L. Richardson
Attorney, Agent, or Firm—Parkhurst & Oliff

[57] ABSTRACT

In a method and apparatus for detecting an information signal and a focussing error signal of an objective lens with respect to a video disc on which main and sub beams emitted from a laser light source are to be focussed as light spots by the objective lens, the main and sub beams reflected by the video disc are made incident as parallel light fluxes upon a detection prism surface which is set substantially at a critical angle with respect to the main beam, but at an angle smaller or larger than the critical angle with respect to the sub beam, and two light fluxes of the reflected main beam which situate on respective sides of a boundary plane including the central light ray and perpendicular to a plane of incidence, and are reflected by the reflection surface are separately received by two light receiving regions which are divided along a boundary plane including the main beam reflected by the reflection surface and perpendicular to the plane of incidence. The focussing error signal is derived as a difference between output signals from the two light receiving regions and the information signal is derived as a sum of the output signals from the two light receiving regions. The sub beam transmitted through and refracted by the reflection surface is received by a light detector and a tracking error signal is derived by detecting a variation in a light amount of the sub beam impinging upon the light detector.

39 Claims, 19 Drawing Figures

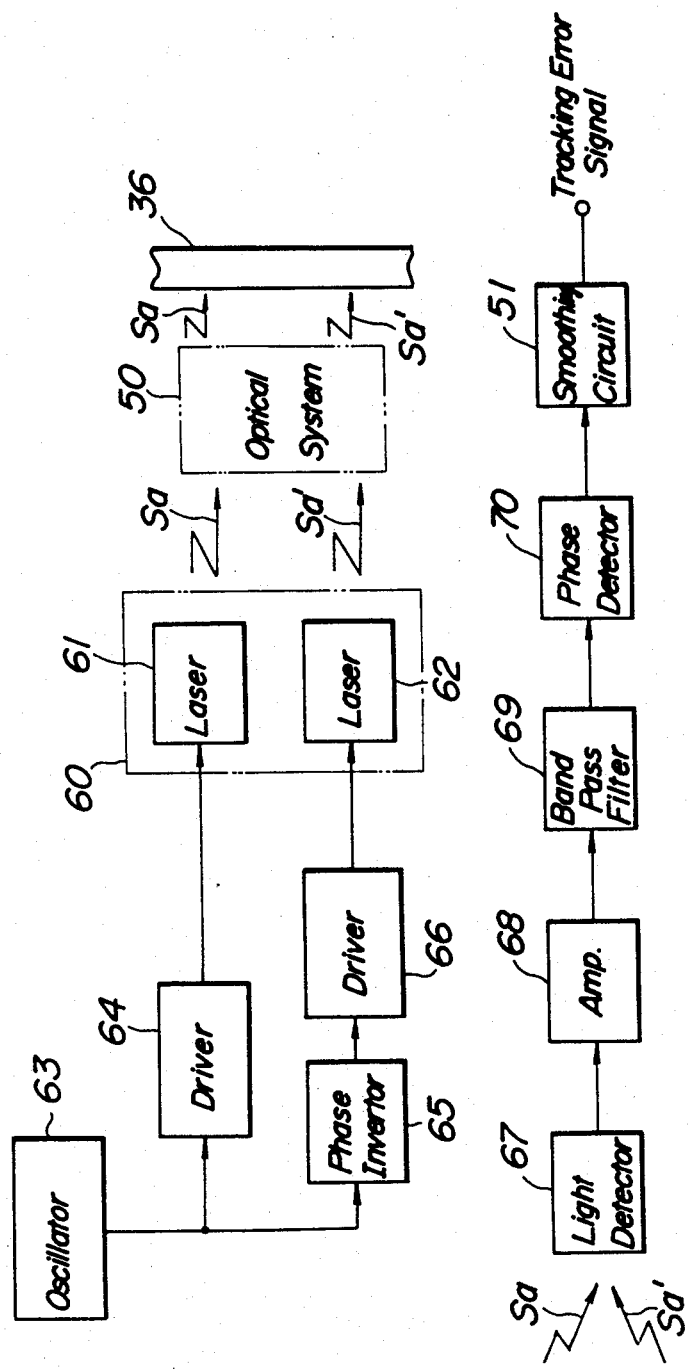

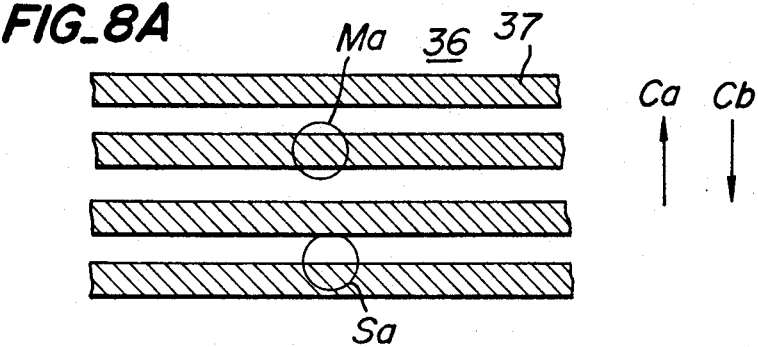
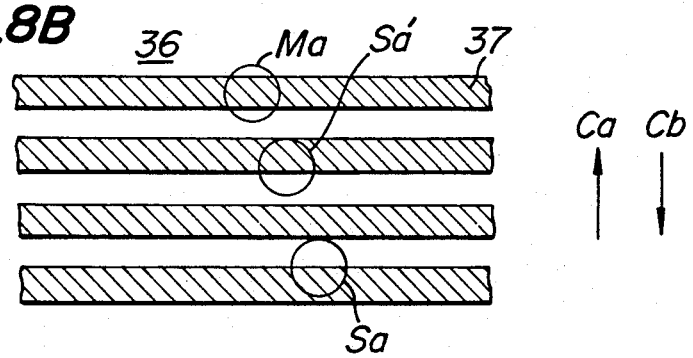
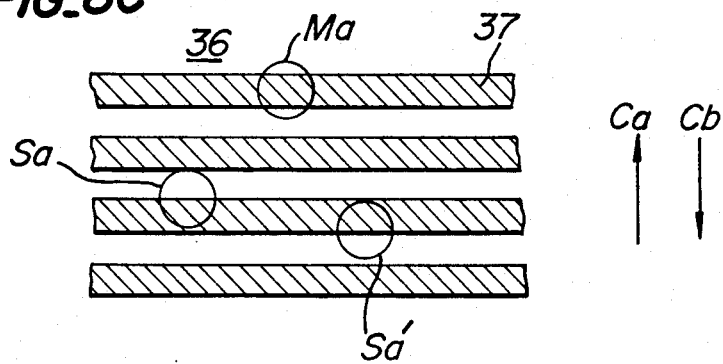

Disc Rotating Direction

METHOD AND APPARATUS FOR REPRODUCING OPTICALLY AN INFORMATION RECORDED ON A RECORD MEDIUM ALONG TRACKS

BACKGROUND OF THE INVENTION

The present invention relates to a method for reproducing optically an information recorded on a record medium along tracks by means of a light beam, and to an apparatus for carrying out such an optically reproducing method. Applicants have filed two other applications revealing similar subject matter having U.S. patent application Ser. Nos. 293,082 and 301,098, filed on Aug. 14, 1981, and Sept. 10, 1981, respectively.

Such information reproducing method and apparatus have been known and have been advantageously applied to an apparatus in which a scanning light spot is projected by an objective lens onto information tracks formed spirally or concentrically in a disc-shaped record medium to read an information recorded along the tracks.

In an apparatus for reproducing or picking-up an information from the above mentioned record medium, the record medium is usually called as a video disc or audio disc in which encoded video and/or audio signals are recorded as optical information such as optical transmittivity, reflection and phase properties. While the video disc is rotated at a high speed such as thirty revolutions per second, i.e. 1,800 rpm, a laser beam emitted from a laser light source is focussed on the tracks of the disc as a light spot and the optical information is read out by detecting the reflected light beam modulated by the information. One of important properties of such a record medium is a very high density of recorded information and thus a width of the information track is very narrow and a space between successive tracks, i.e. a track pitch is also very narrow. In a typical video disc, a pitch of the tracks amounts only to 2 $\mu$m. Therefore, the diameter of light spot should be correspondingly small such as 1 to 2 $\mu$m. In order to pick-up correctly the recorded information from such tracks having very narrow width and pitch, an error in a distance between the objective lens and the tracks, i.e. a focussing error should be reduced as little as possible to make a spot diameter as small as possible.

To this end, the apparatus is provided with a focussing control system in which an amount and a direction of a de-focussed condition of the objective lens with respect to the disc surface are detected to produce a focussing error signal and the objective lens is moved in a direction of the optical axis of objective lens in accordance with the detected focussing error signal.

Furthermore, during the reproduction, the light spot should follow the track precisely. For this purpose, the reproducing apparatus is also provided with a tracking control system in which an error in a position of the light spot with respect to the track, i.e. a tracking error is detected to produce a tracking error signal and the light spot is moved in a direction perpendicular to the track, i.e. a radial direction of the disc in accordance with the detected tracking error signal.

FIG. 1 is a schematic view illustrating an optical pick-up apparatus comprising an embodiment of a focus detection apparatus proposed by the applicant. In this embodiment, a light beam (linearly polarized in a plane of the drawing) emitted from a laser light source 1 is collimated into a parallel light beam by a collimator lens 2 and passes through a polarizing prism 3 and a quarter-wavelength plate 4. Then, the parallel light beam impinges upon an objective lens 5 and is focussed on an information track of a disc 6 as a light spot. The light beam is reflected by an information track (record surface) 7 having a crenellated pit construction of the disc 6 and is optically modulated in accordance with information recorded in the track. Then the light beam is reflected by the polarizing prism 3, because the light beam is polarized in a direction perpendicular to the plane of the drawing and thus, it has passed through the quarter-wavelength plate 4 twice. The light flux reflected by the polarization prism 3 impinges upon a detection prism 8 having a reflection surface 9 and the light flux reflected by this surface 9 is received by a light detector 10. The reflection surface 9 is so arranged with respect to the incident light that under an infocussed condition it makes a given angle with respect to the incident light (parallel light flux) which angle is equal to a critical angle or slightly smaller or greater than the critical angle. Now, for the time being, it is assumed that the reflection surface 9 is set at the critical angle. In the in-focussed condition, the whole light flux reflected by the polarizing prism 3 is totally reflected by the reflection surface 9. In practice, a small amount of light is transmitted into a direction n shown in FIG. 1 due to incompleteness of a surface condition of the reflection surface 9. However, such a small amount of transmitted light may be ignored. If the disc 6 deviates from the in-focussed condition in a direction a in FIG. 1 and a distance between the objective lens 5 and the disc 6 is shortened, the light reflected by the polarizing prism 3 is no longer the parallel beam, but changes into a diverging light beam including extreme light rays $ai_1$ and $ai_2$. On the contrary, if the disc 6 deviates in an opposite direction b, the parallel light beam is changed into a converging light beam including extreme light rays $bi_1$ and $bi_2$. As can be seen in FIG. 1, light rays from an incident optical axis $OP_i$ to the extreme light ray $ai_1$ have incident angles smaller than the critical angle and thus, are transmitted through the reflection surface 9 at least partially as illustrated by $at_1$ (the reflected light being shown by $ar_1$). Contrary to this, light rays between the optical axis $OP_i$ and the extreme light ray $ai_2$ have incident angles larger than the critical angle and thus, are totally reflected by the surface 9 as shown by $ar_2$. In case of deviation of the disc 6 in the direction b, the above relation becomes inversed, and light rays below a plane which includes the incident optical axis $OP_i$ and is perpendicular to the plane of the drawing of FIG. 1, i.e. a plane of incidence, are totally reflected by the reflection surface 9 as denoted by $br_1$, and light rays above said plane are at least partially transmitted through the reflection surface 9 as depicted by $bt_2$ (the reflected light being illustrated by $br_2$). As explained above, if the disc 6 deviates from the in-focussed position, the incident angles of the light rays impinging upon the reflection surface 9 vary in a continuous manner about the critical angle except for the center light ray passing along the optical axis $OP_i$. Therefore, when the disc 6 deviates from the in-focussed position either in the direction a or b, the intensity of the light reflected by the reflection surface 9 varies abruptly near the critical angle in accordance with the above mentioned variation in the incident angles as illustrated in FIG. 2. In this case, senses of the variations of the light intensities on both sides of said plane perpendicular to the incident plane and including the incident optical axis $OP_i$ vary in mutually opposite manner. On the contrary, in the in-focussed condition, the light flux impinging upon the detection prism 8 is totally reflected by the reflection surface 9 and thus, the uniform light flux impinges upon the light detector 10. The light detector 10 is so constructed that the lower and upper light fluxes with respect to said plane are separately received by separate regions 10A and 10B, respectively. That is to say, the light detector 10 is divided along a plane which is perpendicular to the incident plane and includes an optical axis $OP_r$ of reflected light.

FIG. 2 shows a graph representing a variation of an intensity of reflected light in accordance with an incident angle near the critical angle. Curves $R_p$ and $R_s$ indicate the light intensities for P and S polarized light rays, respectively. The curves are obtained when the detection prism 8 is made of material having a refractive index of 1.50. It should be noted that an intensity of a non-polarized light ray is equal to an intermediate value of $(R_p+R_s)/2$.

In FIG. 1, if the disc 6 deviates in the direction a, the light rays of the lower half of the incident light flux have incident angles smaller than the critical angle. Therefore, at least a part of the lower half light flux is transmitted through the reflection surface 9 and the amount of light impinging upon the light receiving region 10A is decreased by an amount equal to the transmitted light. While the upper half of the incident light flux has the incident angles larger than the critical angle and thus, is totally reflected by the surface 9. Therefore, the amount of light impinging upon the light receiving region 10B is not changed. On the contrary, if the disc 6 deviates in the direction b, the amount of light impinging upon the region 10B is decreased, but the amount of light impinging upon the region 10A is not changed. In the in-focussed condition, amounts of light impinging upon the regions 10A and 10B are made equal to each other.

It should be noted that the reflection surface 9 may be set at an angle slightly smaller or larger than the critical angle. In a former case when the disc 6 deviates in the direction a, the amount of light impinging upon the region 10B is first increased and then becomes constant and the amount of light impinging upon the region 10A is decreased abruptly. Whereas, if the disc 6 deviates in the direction b, the amount of light impinging upon the region 10A is first increased and then becomes constant, while the amount of light impinging upon the region 10B is decreased.

In this manner by detecting a difference in output signals from the light receiving regions 10A and 10B by means of a differential amplifier 11, it is possible to obtain the focussing error signal having an amplitude which is proportional to an amount of the deviation from the in-focussed condition and a polarity which represents a direction of the deviation with respect to the in-focussed condition. The focussing error signal thus obtained is used to effect a focussing control for driving the objective lens 5 in the direction of its optical axis. Further, it is possible to derive an information signal corresponding to the pit information recorded in the information track 7 at an output of an adder 12 which produces a sum signal of the output signals from the regions 10A and 10B. Further, in the in-focussed condition, since the light is scarcely transmitted through the reflection surface 9, a loss of light is very small and in the defocussed condition the half of light flux with respect to the central light ray is totally reflected, but an amount of the other half of light flux reflected by the surface 9 is decreased to a great extent, the difference in the amount of light impinging upon the regions 10A and 10B becomes great. Therefore, the very accurate focus detection can be effected with a very high sensitivity.

For instance, when use is made of the objective lens 5 having a numerical aperture NA=0.5 and a focal length f=3 mm and of the detection prism 8 having a refractive index n=1.50 and the disc 6 deviates by about 1 μm, a variation of an incident angle for the extreme right ray which is subjected to the largest variation in incident angle is about 0.015° when can cause a sufficiently large variation in light amount impinging upon the detector regions 10A and 10B.

In the apparatus shown in FIG. 1, the light reflected by the reflection surface 9 is received by the detector 10 having the two light receiving regions 10A and 10B, but it is also possible to detect the light transmitted through the reflection surface 9 by the two light receiving regions or to detect both the reflected light and the transmitted light by two separate light detectors.

In case of reproducing the information out of the information record medium such as the video disc, it is not sufficient to effect the above mentioned focussing control so as to project the small light spot on the information record surface, and it is also necessary to effect a tracking control so as to cause the light spot to follow the given information track accurately.

The applicant has proposed a reproducing apparatus for obtaining the focussing error signal, tracking error signal and the information signal by using the focus detection apparatus shown in FIG. 1. In this reproducing apparatus, use is made of a light detector 20 having four light receiving regions 20A, 20B, 20C and 20D divided along two orthogonal directions as shown in FIG. 3. Now it is assumed that these four regions 20A to 20D produce outputs $E_A$, $E_B$, $E_C$ and $E_D$. At first, sum signals $E_A+E_D$ and $E_B+E_C$ are generated by adders 21A and 21B, respectively. Then a difference signal $(E_A+E_D)-(E_B+E_C)$ between these sum signals is formed by a differential amplifier 22 to produce a focussing error signal. At the same time, sum signals $E_A+E_C$ and $E_B+E_D$ are first formed by adders 21C and 21D, respectively. Then a difference signal $(E_A+E_C)-(E_B+E_D)$ is formed by a differential amplifier 23 and a tracking error signal is derived after suitably processing the difference signal thus formed. An information signal is obtained from an adder 24 which forms a sum signal $E_A+E_B+E_C+E_D$.

In the above mentioned information reproducing apparatus, since the focussing error signal and tracking error signal are detected from the same and single light beam, the tracking error signal is subjected to variation due to the focussing error and the focussing error signal is also affected by the tracking error. Therefore, it is difficult to effect the focussing and tracking servo control in a precise and accurate manner.

SUMMARY OF THE INVENTION

The present invention has for its object to provide a novel and useful method which can retain the various advantages of the reproducing apparatus utilizing the total reflection by the reflection surface set at the critical angle and can obviate the above mentioned drawbacks thereof so as to effect the focussing and/or tracking control in a very precise manner and to obtain an information signal having a high signal to noise ratio.

According to the invention, a method for reproducing optically an information recorded on a record medium along tracks comprises a step of generating at least two light beams;

a step of projecting said light beams onto said record medium by means of an objective lens in such a manner that one of the light beams is positioned on a track to be reproduced and the other beam is situated on the relevant track to be reproduced or another track near the relevant track;

a step of converting each of the light beams reflected by the record medium and collected by said objective lens into a parallel light flux;

a step of separating spatially said light beams from each other by introducing these light beams into an optical member having a reflection surface which is set substantially at a critical angle with respect to one of the beams referred to as a main beam, but at an angle smaller or larger than said critical angle with respect to the other beam referred to as a sub beam; and a step of receiving the thus spatially separated main and sub beams by at least two separate light detectors to generate an information signal recorded on the relevant track and a focussing error signal of said objective lens with respect to the record medium.

In the reproducing method according to the invention an information reading light spot may be formed by either one of the main and sub beams. When the main beam is used as the information reading beam, since the main beam is made incident upon the reflection surface of the optical member substantially at the critical angle, it is possible to derive the focussing error signal by detecting a variation in distribution of the main beam reflected by the reflection surface or the main beam transmitted through the reflection surface or by detecting a variation in light amounts of the reflected and transmitted main beams, and further the information signal may be derived from the reflected and/or transmitted main beams. In this case, when the sub beam is made incident upon the reflection surface at an angle smaller than the critical angle, it is possible to obtain the tracking error signal by detecting a variation in a light amount of the sub beam transmitted through and refracted by the reflection surface. While when the sub beam impinges upon the reflection surface at an angle larger than the critical angle, the tracking error signal may be obtained by detecting a variation in a light amount of the sub beam totally reflected by the reflection surface. Contrary to this, in case of using the sub beam as the information reading beam, the information signal may be derived from the sub beam transmitted through the reflection surface or the sub beam totally reflected by the reflection surface, because the sub beam is made incident upon the reflection surface at an angle smaller or larger than the critical angle. The tracking error signal may be obtained by detecting a variation in a light amount of the main beam totally reflected by the reflection surface. Further, the focussing error signal may be derived by detecting a variation in distribution of the reflected or transmitted main beam or by detecting a variation in light amounts of the reflected and transmitted main beams.

In a preferred embodiment of the information reproducing method according to the invention, said information signal is derived from a first light detector which comprises two bisected light receiving regions for receiving said main beam, said focussing error signal is derived by detecting a variation in distribution of main beam impinging upon the light receiving regions, and a tracking error signal representing a positional deviation of the relevant track and the main beam is derived by detecting a variation in a light amount of the sub beam impinging upon a second light detector.

According to the invention the focussing and tracking error signals can be obtained from the spatially separated light beams reflected from the record medium without being influenced by one another and thus, the focussing and tracking control can be carried out very precisely and the information signal having a high signal to noise ratio can be obtained.

It is still another object of the invention to provide a simple and small apparatus for carrying out the above information reproducing method.

According to the invention an apparatus for reproducing optically an information recorded on a record medium along tracks comprises beam generating means for generating a single main beam and at least one sub beam;

an objective lens for converging said main and sub beams and projecting the main and sub beams onto a track to be reproduced and the relevant track or a track near the relevant track, respectively;

a beam splitting element arranged between said beam generating means and said objective lens for introducing the incident main and sub beams into the objective lens and for emitting the main and sub beams reflected by said record medium and collected by said objective lens toward a direction different from an incident direction;

an optical member for receiving at least a part of said main and sub beams emitted from said beam splitting element and comprising a reflection surface which is set substantially at a critical angle with respect to a light ray parallel to an optical axis of the main beam reflected by the record medium, but is set at an angle smaller than the critical angle with respect to the sub beam reflected by the record medium;

means for converting each of said main and sub beams impinging upon said optical member into a parallel light flux when said objective lens and record medium are in a given positional relation relative to each other;

a first light detecting means comprising a first light detector for receiving the main beam reflected by said reflection surface of the optical member to generate an information signal recorded on the relevant track of the record medium and a focussing error signal of the objective lens relative to the record medium; and a second light detecting means comprising a light detector for receiving the sub beam transmitted through and reflected by said reflection surface of the optical member to generate a tracking error signal representing a positional deviation of the main beam and the relevant track.

In a preferred embodiment of the reproducing apparatus according to the invention, said beam generating means comprises a light source for generating a single light beam and beam splitting means including at least two inclined surfaces for dividing said single beam into said main beam and at least one sub beam.

BRIEF DESCRIPTION OF THE DRAWINGS

FIGS. 7A and 7B are block diagrams illustrating a tracking control system using two sub beams;

FIGS. 8A to 8C are plan views showing another embodiments of the positional relation between the information tracks and light beam spots;

DESCRIPTION OF THE PREFERRED EMBODIMENTS

Figure 4:
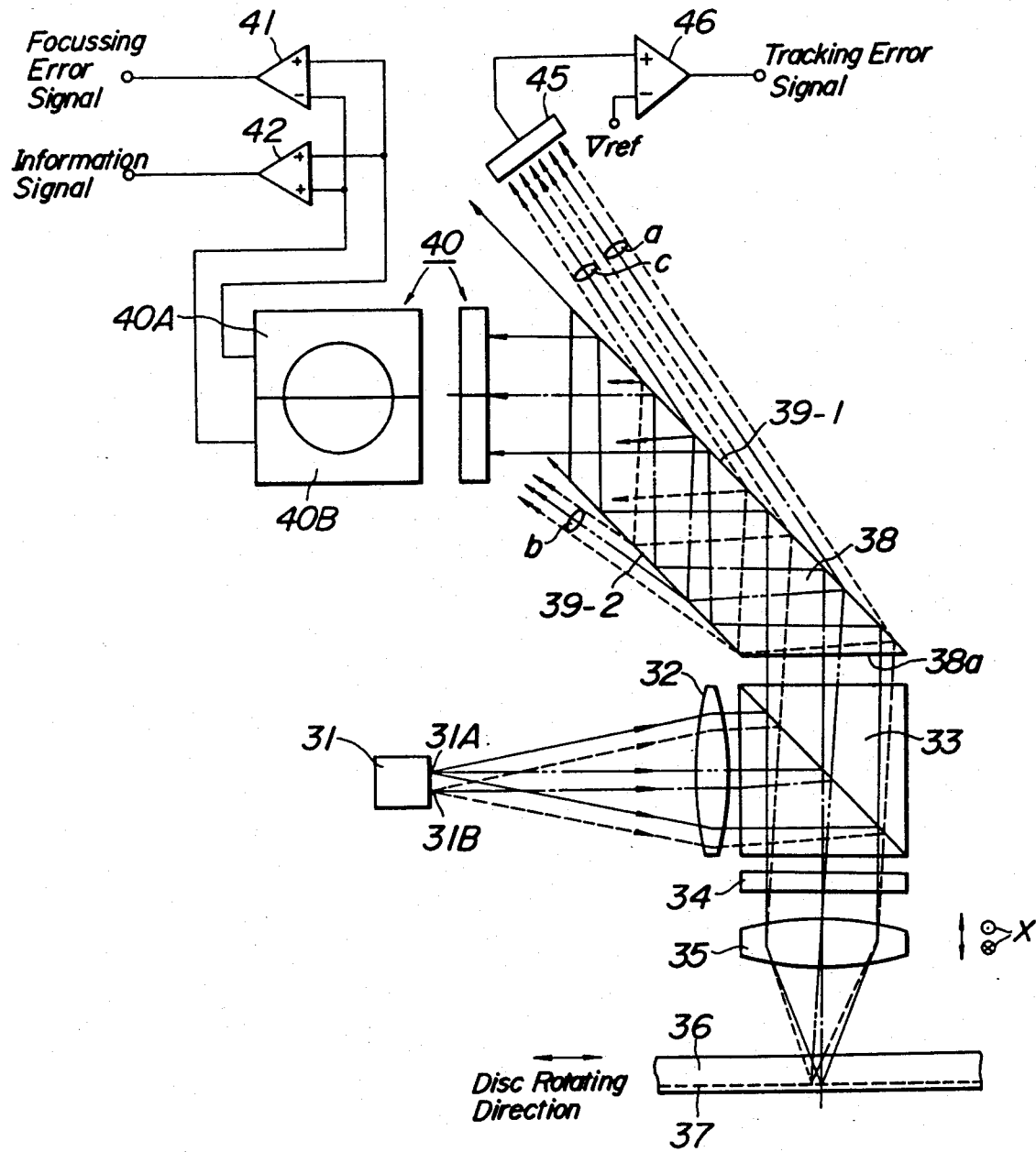
FIG. 4 is a schematic view illustrating an embodiment of an information reproducing apparatus according to the invention.

FIG. 4 is a schematic view showing an embodiment of the information reproducing apparatus according to the invention. In this embodiment, a reference numeral 31 denotes a laser light source having two light emitting points 31A and 31B. A light beam (shown by a solid line) emitted from the point 31A is used as a main beam for reproducing an information and a light beam (illustrated by a broken line) emitted from the point 31B is used as a sub beam for obtaining a tracking error signal.

The two light beams emitted from the laser light source 31 are converted into parallel light fluxes by a collimator lens 32. These two parallel beams are inclined with respect to each other due to the fact that a central light ray (denoted by a single-dotted chain line) in the main beam impinges on the collimator lens 32 at its center, whereas a central light ray (represented by a double-dotted chain line) in the sub beam impinges upon the collimator lens 32 at a point shifted from the lens center. When the collimator lens 32 has a focal length f of 9 mm, and a distance between the two light emitting points 31A and 31B is 125 μm, the inclination angle between these two beams is about 48' (48 minutes).

The main and sub beams are S-polarized with respect to a polarizing reflection surface of the prism 33 and thus, are reflected thereby toward a quarter-wavelength plate 34. The light beams (circularly polarized) transmitted through the plate 34 is made incident upon an objective lens 35.

In the present embodiment, since the objective lens 35 is arranged at a focal point of the collimator lens 32, the main and sub beams are made superimposed upon each other at the objective lens. However, if the both beams have a diameter which larger or smaller than an aperture of the objective lens to some extent, the objective lens may be disposed at a point remote from the focal point of the collimator lens 32.

The main and sub beams are focussed on a record surface 37, i.e. an information track of the disc 36 by means of the objective lens 35. Since the main beam is in parallel with the optical axis of the objective lens 35, it forms a spot on the optical axis. However, since the sub beam is inclined with respect to the optical axis, it forms a spot at a position shifted from the optical axis. For instance, when the main and sub beams are inclined with respect to each other by the angle of about 48' explained above, a distance between the two spots on the disc is about 60 μm, provided that the objective lens has a focal length of 4.3 mm.

The main and sub beams reflected by the record surface 37 are collected by the objective lens 35 and are transmitted through the quarter-wavelength plate 34. The polarizing direction of the light beams transmitted through the plate 34 is changed by 90 degrees and thus, they become P-polarized light beams. Then the beams are transmitted through the polarizing prism 33 and are made incident upon a detection prism 38.

In this embodiment, the prism comprises two opposite reflection surfaces 39-1 and 39-2 which are set substantially at a critical angle with respect to the central light ray of the main beam. Then the main beam is repeatedly reflected between the surface 39-1 and 39-2 (in this embodiment three times). Therefore, when the reflected main beam is detected by a light detector 40 having bisected light receiving regions 40A and 40B and a difference between outputs from the two regions is formed by a differential amplifier 41, the focussing error signal can be obtained as explained above with reference to FIGS. 1 and 2. Further, the information signal can be derived from an adder 42 which forms a sum signal of outputs from the two regions 40A and 40B. As apparent from the graph shown in FIG. 2, when the P-polarized light is made incident upon the reflection surfaces 39-1 and 39-2, the intensity of the reflected light changes very abruptly near the critical angle as compared with the S-polarized light and thus, the sensitivity of focus error detection can be made extremely high.

Since the sub beam is inclined with respect to the main beam, the sub beam is made incident upon the reflection surfaces 39-1 and 39-2 at an angle which is smaller or greater than the critical angle. In the present embodiment, the incident angle of the sub beam is set to be smaller than the critical angle. Then the sub beam is substantially transmitted through the reflection surfaces and is refracted thereby. Since only a very small part of the incident sub beam is reflected by the reflection surfaces 39-1, 39-2, only a negligibly small part of the sub beam is made incident upon the light detector 40. For instance, in the above numerical example in which the sub beam is inclined by 48' with respect to the main beam, which impinges upon the detection prism at right angles with respect to its entrance surface 38a and the detection prism 38 has a refractive index of 1.5, an inclination angle between the main and sub beams at the reflection surfaces 39-1 and 39-2 is about 32'. Then the transmittivity of the P-polarized light beam is about 69%. Since the sub beam is reflected by three times in the detection prism, the total transmittivity becomes about 97% and only a small part of the sub beam amounting to about 3% impinges upon the main beam detector 40.

Therefore, the focussing error signal and information signal are not affected at all by the sub beam and have very high signal to noise ratio.

Figure 1:
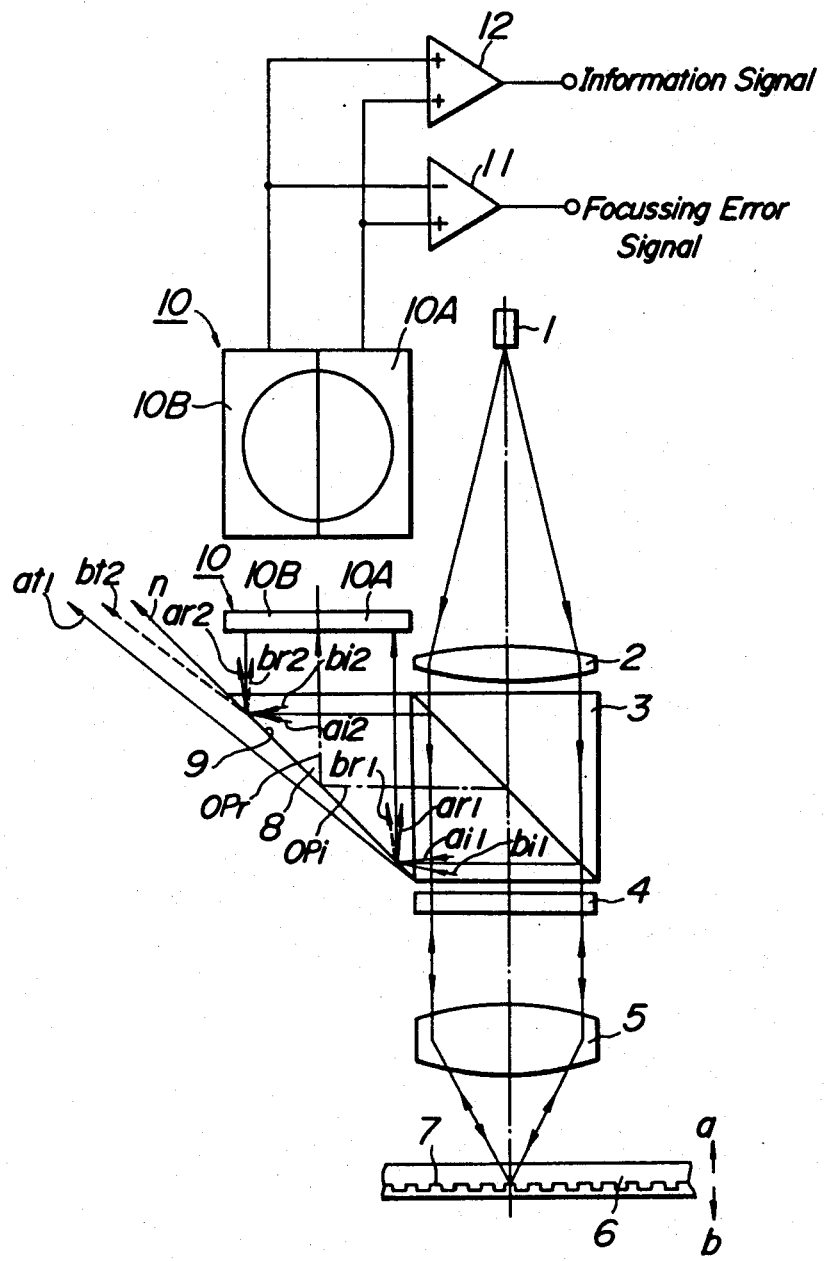
FIG. 1 is a schematic view showing an embodiment of a known apparatus for reproducing optically an information.
Figure 2:
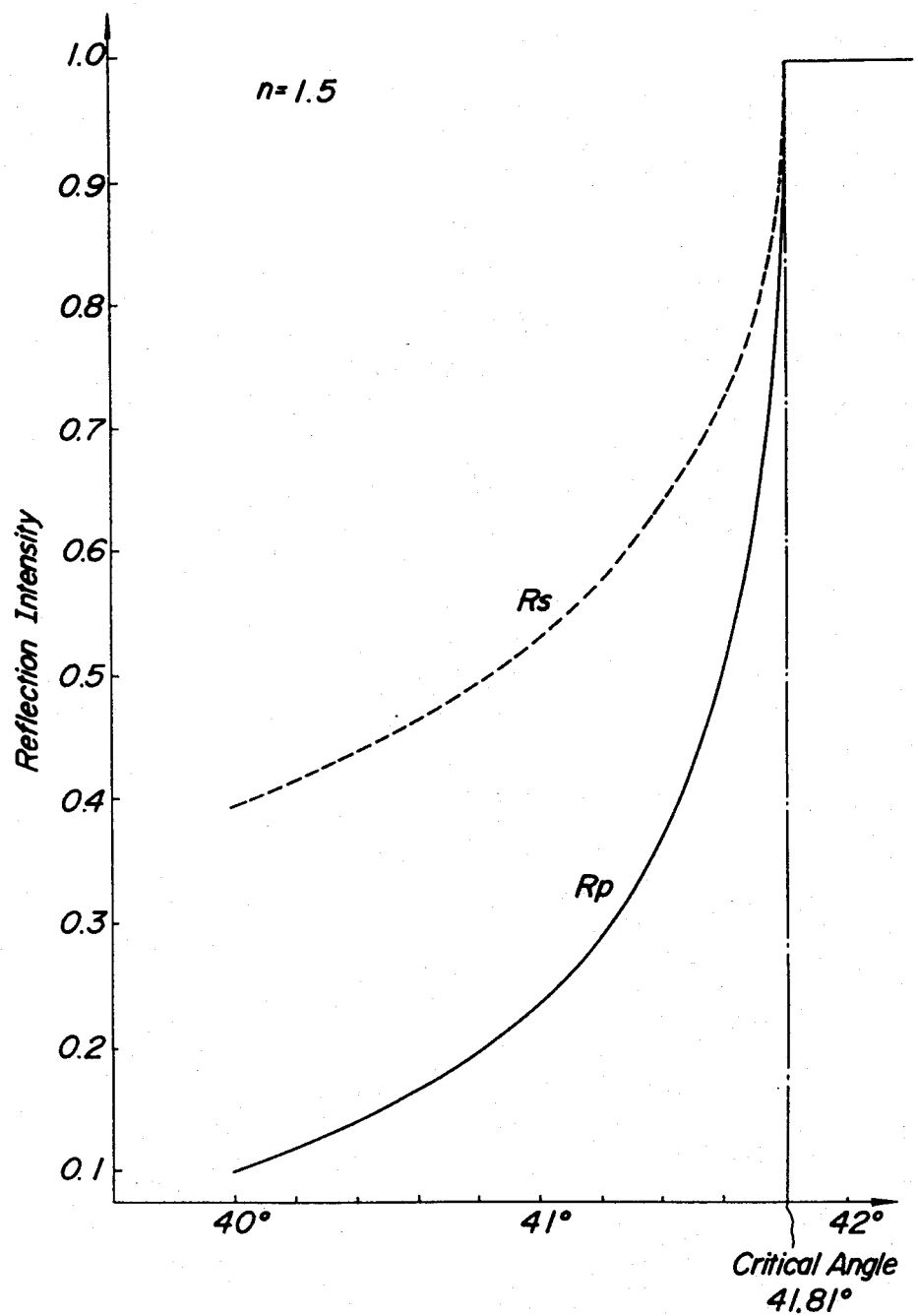
FIG. 2 is a graph showing an intensity of reflected light having an incident angle near a critical angle.
Figure 3:
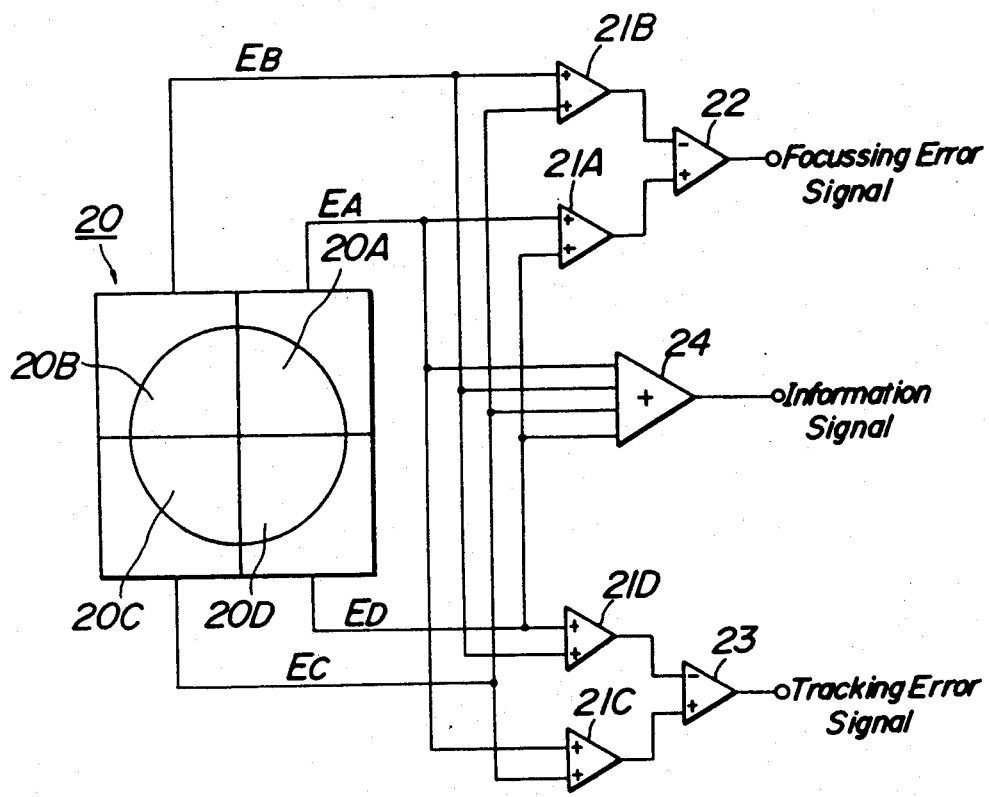
FIG. 3 is a circuit diagram showing an embodiment of a tracking signal generating circuit proposed by the applicant.

It should be noted that for the sake of simplicity, in the drawings of FIGS. 1 and 4 the detection prisms 8 and 38 have a refractive index in $=\sqrt{2}$ and thus, the critical angle is about 45°.

The amount of the sub beam impinging upon the light detector 40 may be further reduced by decreasing the luminous intensity of the sub beam, if necessary.

In the present embodiment transmitted light fluxes a and c of the sub beam at first and third reflections, respectively are detected by a single common light detector 45. It is a matter of course that a transmitted light flux c of the sub beam at the second reflection may be detected or all of the three transmitted sub beam fluxes a, b and c may be detected by means of two separate light detectors.

According to the present invention, by utilizing the detection prism for detecting the focussing condition with the aid of the total reflection at the critical angle can be advantageously used to separate spatially the main and sub beams which are inclined with respect to each other be a very small angle.

The main and sub beams may be spatially separated from each other by arranging the detection prism at a focal plane of the objective lens having a very long focal length. However, in such a case, the optical system becomes large and is hardly used practically. In the embodiment shown in FIG. 4, the two beams are emitted from the laser light source 31 and are projected upon the disc, and the reflected light beams are spatially separated from each other, but it is also possible to produce three beams from the laser light source and the reflected three beams may be spatially separated from one another.

Next, several methods of producing the tracking error signal from the sub beams separated from the main beam will be explained.

Figure 5A:
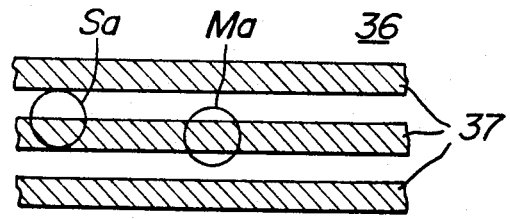
FIGS. 5A to 5D are plan views depicting positional relations between information tracks and light beam spots.
Figure 6:
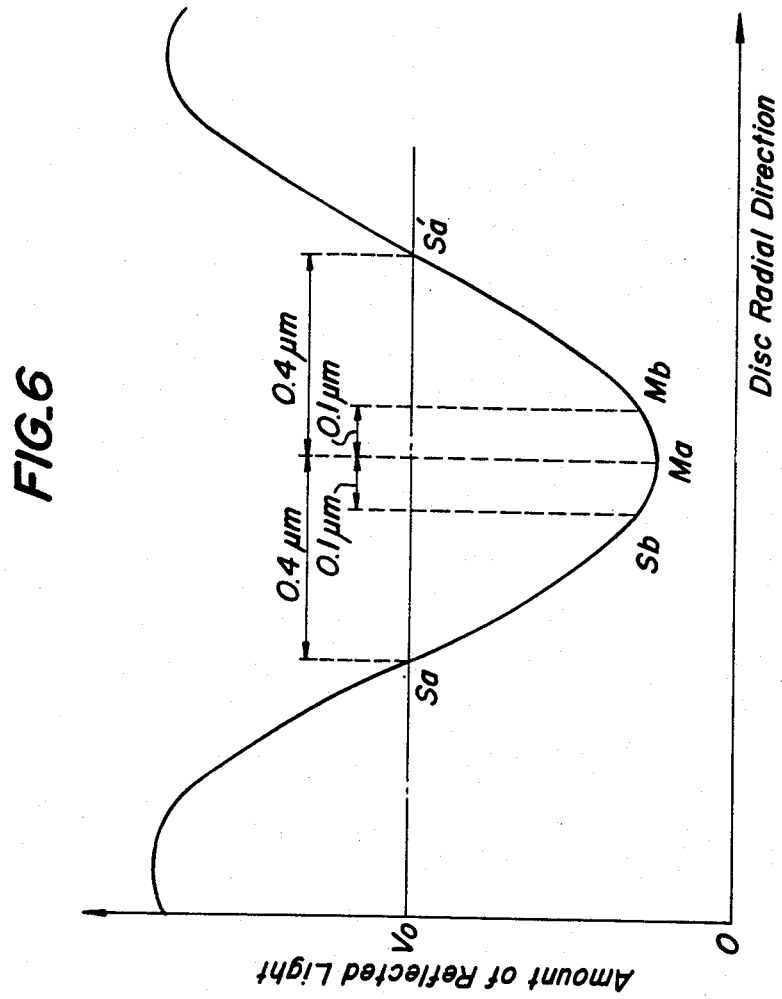
FIG. 6 is a graph for explaining a manner of deriving the tracking error signal according to the invention.

In a first method, as illustrated in FIG. 5A, a main beam spot Ma projected by the optical system shown in FIG. 4 onto the disc 36 is positioned at a center of an information track 37 having a width of about 0.8 μm for reading out the recorded information, and a sub beam spot Sa is situated at an edge of the related track 37. In such an arrangement, when the main and sub beam spots are shifted with respect to the track 37 in the radial direction of the disc 36, the amount of light reflected by the disc changes as shown in FIG. 6. When there is not a tracking error, the main beam spot Ma situates on a characteristic curve at a point at which an inclination of the curve is zero (i.e. first derivative is zero), while the sub beam spot Sa is positioned on the curve at a point at which the curve has the maximum slope (i.e. second derivative is zero). When the sub beam spot Sa deviates in the disc radial direction, the amount of the reflected sub beam is abruptly decreased or increased about a light amount ($V_o$). Therefore, by detecting the amount of the reflected sub beam by means of the light detector 45, there can be obtained an output signal which decreases or increases about a level corresponding to the value $V_o$ in accordance with the deviation of the sub beam spot Sa with respect to the track edge. Then by comparing the output signal with a reference voltage $V_{ref}$ corresponding to the value $V_o$ by a differential amplifier 46 shown in FIG. 4, it is possible to derive the tracking error signal having an amplitude representing the amount of deviation and a polarity representing the direction of the deviation. Therefore, when the tracking servo control is effected by the detected tracking error signal to move the objective lens 35 in the tracking direction shown by X in FIG. 4 in such a manner that the amount of the reflected sub beam is made always equal to the value $V_o$, the main beam spot is always maintained at the track center, because the distance between the main and sub beam spots is made always constant. It should be noted that in this method there is a fear that the tracking error signal might be affected by the variation in the luminous intensity of the light source, unevenness in the reflection factor of the record surface, etc.

Figure 5B:
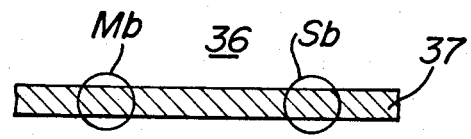

In a second method, the main beam spot Mb and the sub beam spot Sb are symmetrically shifted in opposite directions with respect to the track center as illustrated in FIG. 5B. In such an arrangement, the amounts of the reflected main and sub beams are made equal to each other in the in-focussed condition as shown by Mb and Sb in FIG. 6. Therefore, in this case, the tracking error signal can be obtained by deriving a difference between outputs from the light detector 40 receiving the main beam and the light detector 45 receiving the sub beam. By driving the objective lens 35 shown in FIG. 4 in the disc radial direction X in accordance with the tracking error signal in such a manner that the amounts of the main and sub beams reflected by the disc are made identical with each other, the main beam can be maintained at the given position slightly shifted from the track center. It should be noted that since the main beam spot Mb is deviated from the track center only by a small distance (for instance, about 0.1 μm), the information signal can be reproduced without cross talk between the adjacent tracks. Further, the influence of the variation in the luminous intensity of the light source can be cancelled out.

Figure 5C:
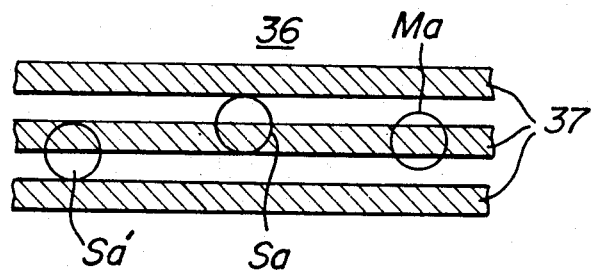

In a third method, a single main beam and two sub beams are projected onto the disc as shown in FIG. 5C. That is to say, the main beam spot Ma is situated at the track center, the first sub beam spot Sa is positioned at one edge of the related track, and the second sub beam spot S'a is situated at the other edge of the relevant track. In such an arrangement, the amounts of reflected main beam and the first and second sub beams have a mutual relation as denoted by Ma, Sa and S'a in FIG. 6. When the beam spots are shifted upwards in FIG. 5C, the amounts of the reflected first and second sub beams are increased and decreased, respectively. Contrary to this, when the beams deviate downwards in FIG. 5C, the amounts of the reflected first and second sub beams are decreased and increased, respectively. Therefore, by detecting the reflected first and second sub beams by means of first and second light detectors, respectively, it is possible to derive the desired tracking error signal by deriving a difference between outputs from these detectors. By driving the objective lens 35 in the disc radial direction X in accordance with the detected tracking error signal in such a manner that the amounts of the reflected first and second sub beams are made equal to each other, a given tracking servo control can be effected. It should be noted that in this third method, since the second sub beam is made far away from the optical axis of the objective lens, there might be a fear that the influence of aberration might occur easily.

Figure 5D:
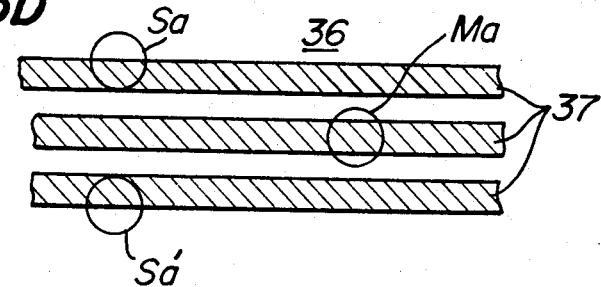

In a fourth method, three light emitting points are provided in the laser light source 31 in such a manner that each of these points are situated at respective apexes of a triangle and a single main beam and first and second sub beams are projected onto the disc as illustrated in FIG. 5D. That is to say, the main beam spot Ma is situated at the track center and the first and second sub beam spots Sa and S'a are positioned at edges of adjacent tracks, respectively, said edges being opposite to each other viewed in the disc radial direction. In this method, the tracking error signal can be obtained in the manner similar to that of the above mentioned third method. Then the desired tracking servo control can be carried out by driving the objective lens 35 in the disc radial direction X in such a manner that the amounts of the reflected first and second sub beams are made equal to each other. In the present method, since the first and second sub beam spots are separated from the main beam spot by the same distance, the influence of the aberration can be substantially neglected.

In case of using the two sub beam spots Sa and S'a as in the third and fourth methods, the first and second sub beams may be inclined with respect to the main beam by angles of 48' and 2×48', respectively. Then the first sub beam is transmitted through the reflection surfaces 39-1 and 39-2 at an angle of 8.3° with respect to the reflection surfaces, while the second transmitted sub beam is inclined by an angle of 11.8° with respect to the reflection surfaces. In this manner upon transmitting through the reflection surfaces, the first and second sub beams are angularly shifted with respect to each other and thus, they can be easily separated from each other.

Further, the tracking error signal may be derived from the single light detector which commonly receives the first and second sub beams. FIG. 7A is a block diagram showing an embodiment of such an apparatus. In this embodiment, the light source 60 comprises two semiconductor lasers 61 and 62. The first laser 61 is driven with a driving signal of a frequency f by means of an oscillator 63 and a driving circuit 64, whereas the second laser 62 is driven with a driving signal also having the frequency f, but having a phase inverted to that of the driving signal to the first laser 61 by means of the oscillator 63, a phase inverter 65 and a driving circuit 66. First and second sub beams Sa and S'a emitted from the first and second lasers 61 and 62, respectively are projected upon a disc 36 by means of the optical system 50 similar to that shown in FIG. 4. The first and second sub beams reflected by the disc 36 are received by a single light detector 67 via the optical system 50 and an output from the detector is amplified by an amplifier 68 and is supplied to a band pass filter 69. The filter 69 extracts a signal component having the frequency f and the extracted signal component is phase detected by a phase detecting circuit 70 which operates in synchronism with the signal from the oscillator 63. Then the detected output is smoothed by a smoothing circuit 51 to produce a given tracking error signal.

Figure 7B:
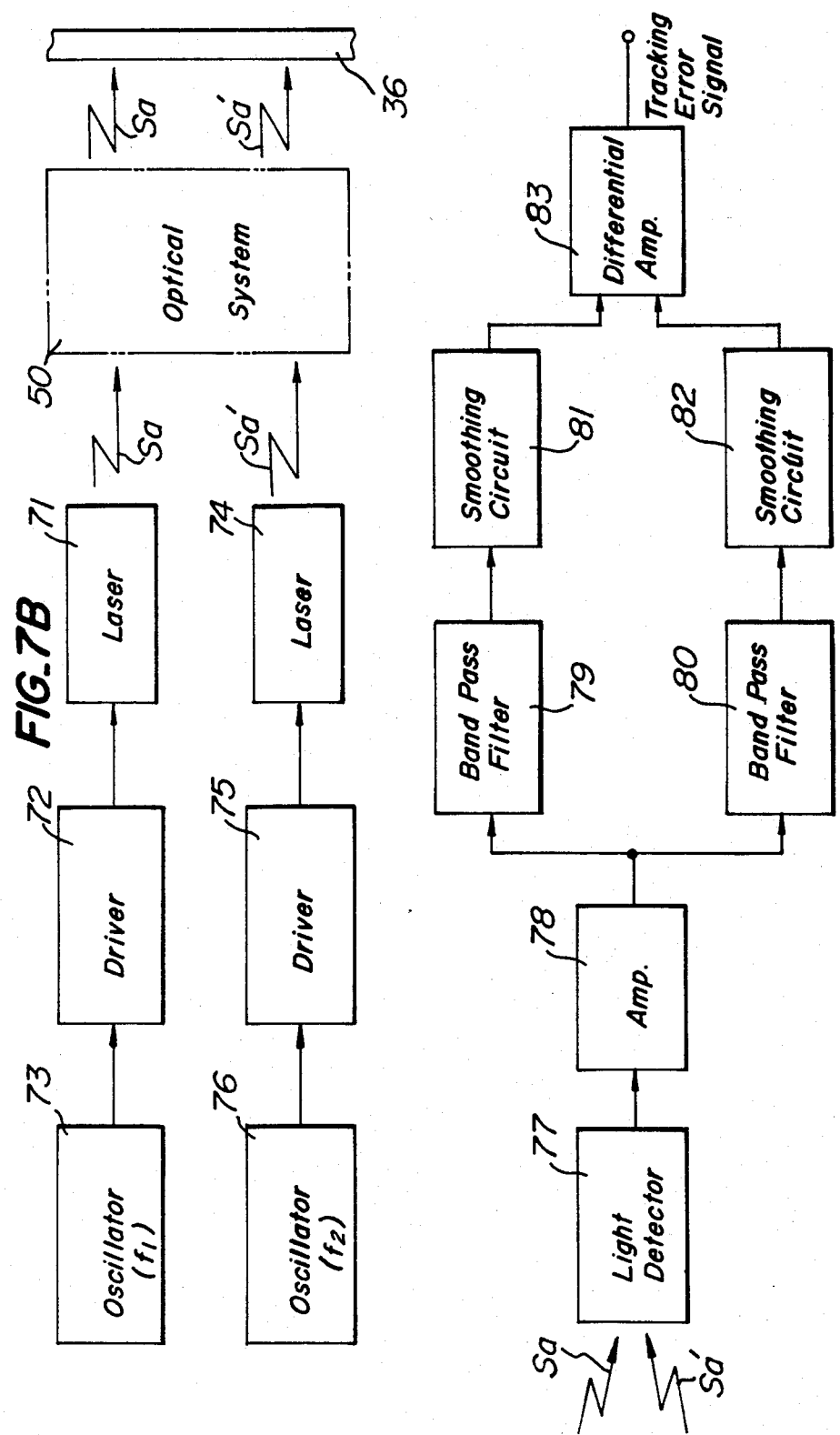

FIG. 7B is a block diagram showing another embodiment of the apparatus according to the invention. In this embodiment, a first sub beam Sa is emitted from a first semiconductor laser 71 which is driven with a driving signal of a frequency $f_1$ by means of an oscillator 73 and a driving circuit 72, and a second sub beam is emitted from a second semiconductor laser 74 which is driven with a driving signal of a frequency $f_2$ by means of an oscillator 76 and a driving circuit 75. These first and second sub beams Sa and S'a are projected by means of the optical system 50 onto the disc 36 and the sub beams reflected by the disc are received by a single light detector 77. An output from the detector is amplified by an amplifier 78 and is then supplied to band pass filters 78 and 80 which extract signal components of the frequencies $f_1$ and $f_2$, respectively. The extracted signal components are smoothed by smoothing circuits 81 and 82. Then a difference between these two signal components is formed by a differential amplifier 83 to derive the desired tracking error signal.

It should be noted that the arrangement of the main beam and one or two sub beams with respect to the tracks may be modified in various ways. For instance, the optical system shown in FIG. 4 may be arranged in various postures with respect to the disc and then the positional relation of the beam spots with respect to the tracks will be also changed. If the optical system shown in FIG. 4 is rotated by 90° in a clockwise or anti-clockwise direction about the optical axis of the objective lens 35 (the disc 36 being not moved), the sub beam spot or spots shown in FIGS. 5A to 5C will be rotated by 90° in a clockwise or anti-clockwise direction about the main beam spot. Then the sub beam spot will be situated at an edge of a track near the track on which the main beam is projected. FIGS. 8A, 8B and 8C are plan views showing the positional relation between the main beam spot Ma and one or two sub beams spots Sa, S'a. In case of rotating the optical system in the anti-clockwise direction by 90°, the center of the rotating disc 36 is situated at a position in a direction shown by an arrow Ca, whereas when the optical system 36 is rotated in the clockwise direction, the disc center is positioned in the direction denoted by an arrow Cb. In this manner, the positional relation on the disc between the main beam spot and one or two sub beam spots is determined in accordance with the direction of the reflection surfaces of the detection prism and the positional relation of the detection prism with respect to the track direction of the rotating disc. In a preferred embodiment, the main beam spot is situated on the track center and the single sub beam spot is partially positioned on the track or the two sub beam spots are situated symmetrically with respect to the track center and are positioned partially on the track or tracks. The main beam reflected from the disc is made incident upon the reflection surface of the detection prism substantially at the critical angle, and the one or two sub beams are made incident upon the reflection surface at an angle smaller than the critical angle. In the embodiment shown in FIG. 4, the light detector 40 is so arranged to receive the main beam reflected by the reflection surfaces 39-1 and 39-2. However, the detector may be arranged to receive the main beam transmitted through and refracted by the reflection surfaces and the tracking error signal may be obtained by comparing the output from the detector with a predetermined threshold value. Alternatively, the tracking error signal may be derived by detecting a variation in distribution of the transmitted light fluxes of the main beam. It is matter of course that in such a case the main beam is made incident upon the reflection surfaces at an angle smaller than the critical angle. Further in the embodiment illustrated in FIG. 4, the light emitting points 31A and 31B of the laser light source 31 is spaced in the direction of the optical axis of the objective lens 35. However, the detection prism 38 and the light detectors 40 and 45 may be rotated by 90° about the optical axis of the objective lens. Then the two light emitting points of the laser light source may be separated in a direction perpendicular to the optical axis of the objective lens, i.e. in a direction perpendicular to the plane of the drawing.

Figure 9:
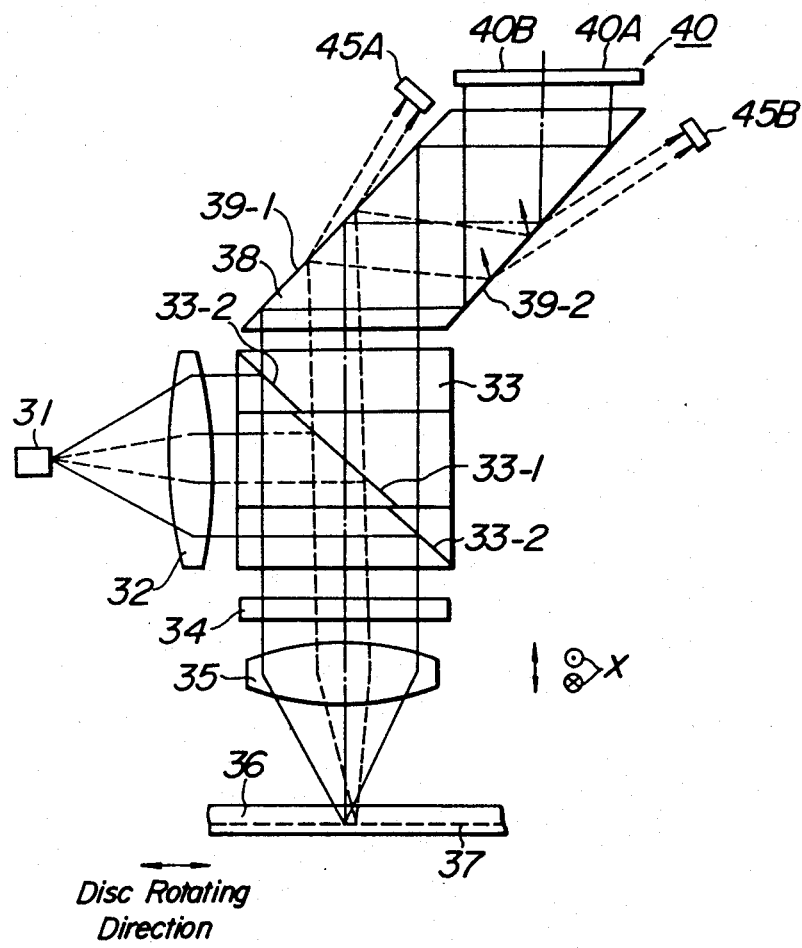
FIG. 9 is a schematic view of another embodiment of the information reproducing apparatus according to the invention.

FIG. 9 is a schematic view illustrating another embodiment of the information reproducing apparatus according to the invention. In this embodiment the elements similar to those shown in FIG. 4 are denoted by the same reference numerals. In this embodiment, a laser light source 31 generates a single laser beam from which main and sub beams are formed in the following manner. The beam is converted into a parallel light flux by a collimator lens 32 and the collimated light flux is made incident upon a polarizing prism 33. The prism 33 comprises a central polarizing surface portion 33-1 and a peripheral polarizing surface portion 33-2, the central portion being inclined to the peripheral portion 33-2 by a small angle. Therefore, a central portion of the incident light flux is reflected towards a direction which is slightly inclined to the reflected peripheral portion. Then, the peripheral light flux forms a main beam spot on a disc 36 on an optical axis of an objective lens 35 via a quarter-wavelength plate 34 and the central light flux forms a sub beam spot which is slightly shifted from the main beam spot on the disc 36. The reflected main beam is made incident upon a detection prism 38 at right angles, but the sub beam is made incident upon the prism with being inclined to the main beam. Therefore, the main beam formed by the peripheral light flux is reflected by the reflection surfaces 39-1 and 39-2 and impinges upon a first light detector 40 having two light receiving regions 40A and 40B. The sub beam constituted by the central light flux is transmitted through the reflection surfaces 39-1 and 39-2 and is received by second and third light detectors 45A and 45B. In this manner, according to the present embodiment the peripheral light flux and central light flux of the single beam can be used as the main and sub beams, respectively.

Figure 10:
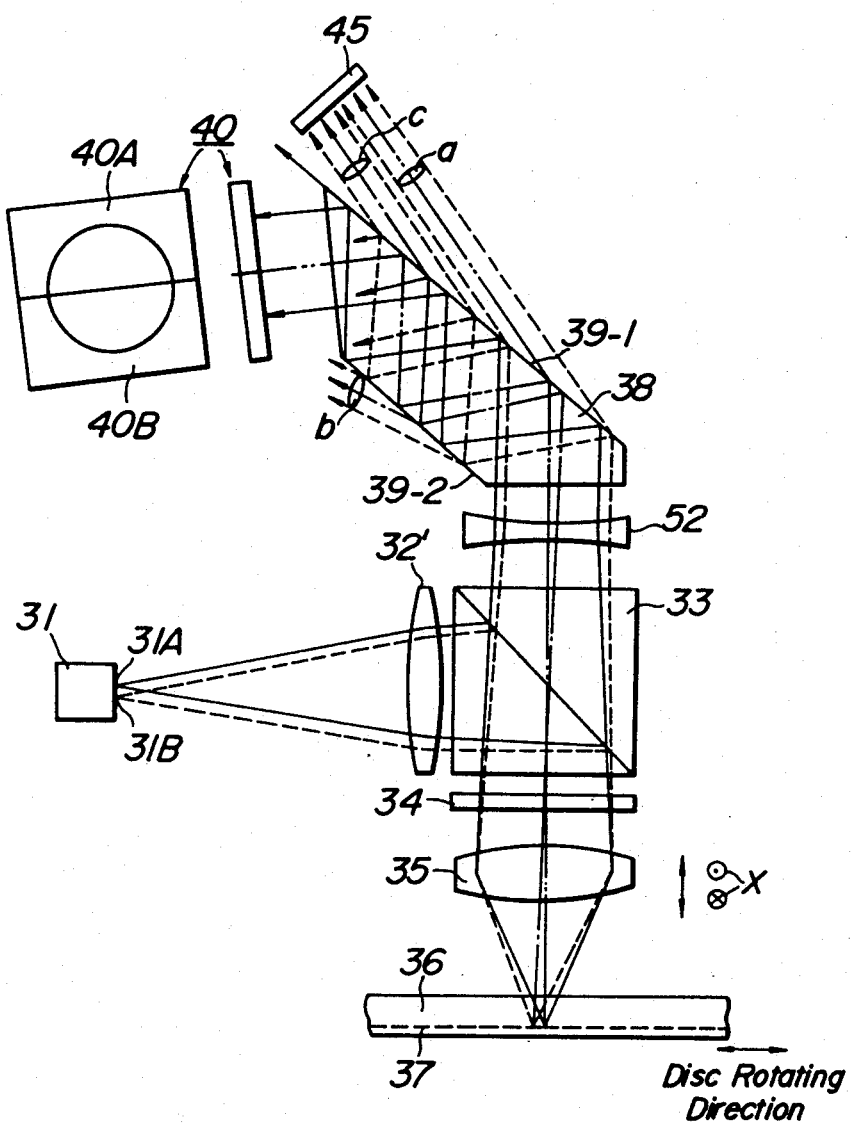
FIG. 10 is a schematic view showing still another embodiment of the information reproducing apparatus according to the invention.

FIG. 10 is a schematic view illustrating still another embodiment of the information reproducing apparatus according to the invention. Also in this embodiment the elements similar to those shown in FIG. 4 are represented by the same reference numerals. According to this embodiment, use is made of a convex lens 32' instead of the collimator lens 32 and the main and sub beams reflected by the disc 36 are converged. Further, between the polarizing prism 33 and the detection prism 38 is arranged a concave lens 52 which converts the converging main and sub beams reflected from the disc 36 into the parallel main and sub beams, respectively. This arrangement can offer an advantage in that the detection prism 38 and the light detectors 40 and 45 can be made smaller in size. Alternatively, if a cross sectional area of the incident light flux upon the detection prism is made equal to that in FIG. 4, there can be obtained an advantage that a cross sectional area of the incident light flux upon the objective lens 35 can be made larger than that in FIG. 4. It should be further noted that the main and sub beams reflected from the disc may be diverging light fluxes. In such a case, a convex lens may be inserted between the polarizing prism 33 and the detection prism 38 so as to convert the diverging main and sub beams into parallel light fluxes.

According to the invention, the focussing and tracking control may be effected by driving the objective lens in its optical axis direction and the direction perpendicular to the optical axis and the track, respectively in accordance with the focussing and tracking error signals.

Figure 11A:
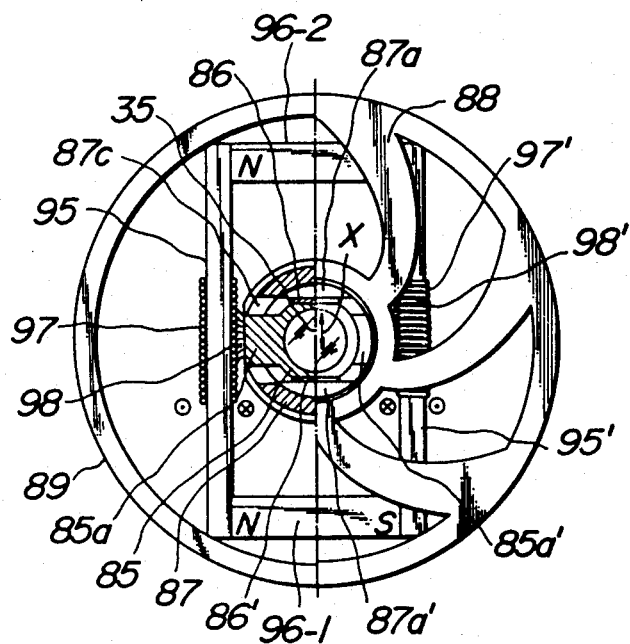
FIGS. 11A and 11B are plan and front views showing partially cut away an embodiment of an objective lens driving device applicable to the present invention.
Figure 11B:
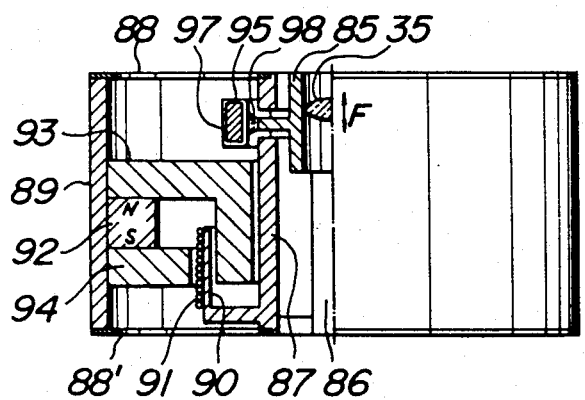

FIGS. 11A and 11B are plan and partially cross sectional views illustrating an embodiment of an apparatus for driving the objective lens in the focussing direction as well as in the tracking direction.

The objective lens 35 is fixed in a tubular lens holder 85 made of magnetic material. The lens holder 85 is supported by a pair of leaf springs 86 and 86' which extend upright in parallel with each other symmetrically with respect to the optical axis of the lens 35. Lower ends of the leaf springs 86 and 86' are secured to projections 87a and 87a' formed integrally with an intermediate cylindrical body 87 at its lower end portion. In this manner the lens 35 is supported movably in the tracking direction X. The cylindrical body 87 is made of non-magnetic material and has formed therein a pair of slots (in the drawing only one slot 87c is shown) at its upper portion which surrounds the lens holder 85. The slots are formed symmetrically with respect to the optical axis of lens. The lens holder has formed integrally therewith a pair of projections 85a and 85a' which project from the cylindrical body 87 through the slots 87c. First and second magnetic members, i.e. yokes 95 and 95' connected to each other at both end portions by means of permanent magnets 96-1 and 96-2 are arranged around the intermediate cylindrical body 87 in such a manner that middle portion of the first and second magnetic members 95 and 95' face the first and second projections 85a and 85a' of lens holder 85. On the first and second yokes 95 and 95' are wound first and second coils 97 and 97' at their middle portions and gaps between the first and second coils 97 and 97' and the first and second projections 85a and 85a', respectively are filled with magnetic fluids 98 and 98'. The apparatus further comprises an outer cylindrical body 89 arranged coaxially with the intermediate cylindrical body 87. These cylindrical bodies 87 and 89 have substantially same axial lengths and are coupled with each other at their upper and lower ends by means of a pair of generally disc-shaped leaf springs 88 and 88', respectively in such a manner that the intermediate cylindrical body 87 and thus the lens 35 can move in the focussing direction F. As clearly shown in FIG. 11A the disc-shaped leaf springs 88 and 88' have a plurality of spiral arms, so that the intermediate cylindrical body 87 moves in the focussing direction F while it rotates or twists slightly about the optical axis. The magnetic members 95, 95', 96-1 and 96-2 are secured to the outer cylindrical frame 89 by means of suitable connecting means not shown. Therefore to the intermediate cylindrical body 87 are only secured the lens holder 85, the lens 35 and the leaf springs 86 and 86', and thus the assembly moving in the focussing direction F can be made extremely light in weight and small in size.

In order to move the intermediate cylindrical frame 87 and thus the objective lens 35 in the focussing direction F, a moving coil 91 is wound on a ring 90 formed integrally with the intermediate cylindrical frame 87 and a ring-shaped permanent magnet 92 and ring-shaped yokes 93 and 94 are arranged in a space between the intermediate and outer cylindrical bodies 87 and 89.

When an electric current corresponding to the detected focussing error signal is supplied to the moving coil 91, the moving coil 91 is subjected to a mechanical force in the focussing direction F and thus, the intermediate cylindrical body 87, the leaf springs 86, 86', the lens holder 85 and the objective lens 35 are moved in the focussing direction F. In this manner, the objective lens 35 can be shifted in the focussing direction F and thus, the light spot formed by the objective lens 35 can be correctly focussed onto the information track.

In the tracking servo mechanism two closed magnetic flux paths are formed by the permanent magnets 96-1 and 96-2 symmetrically with respect to a plane passing through the optical axis of the objective lens 35 and perpendicular to the tracking direction X. One of the magnetic flux paths is formed in the following members; N pole of the permanent magnet 96-1—a first half of the yoke 95—lens holder 85—a first half of the yoke 95'—S pole of the magnet 96-1 and the other of the magnetic flux paths is formed by the following elements, N-pole of the permanent magnet 96-2—a second half of the yoke 95—lens holder 85—a second half of the yoke 95'—S pole of the magnet 96-2. The coils 97 and 97' are arranged in the above mentioned magnetic flux paths. Therefore, when currents are flown through the coils 97 and 97' in the direction shown in FIG. 11A, the coil portions exposed in the magnetic fluxes are subjected to force directing downward in FIG. 11A in accordance with the amount of the currents. However, since the coils 97 and 97' are wound on the fixed yokes 95 and 95', respectively, they could not be moved and the lens holder 85 and thus the objective lens 35 are moved upwards in FIG. 11A due to the reaction. When the direction of the current flow is reversed, the objective lens 35 is moved downwards in FIG. 11A. Since the magnetic fluxes generated by the permanent magnets 96-1 and 96-2 are symmetrical with respect to a line passing through the optical axis of the lens 35 and perpendicular to the tracking direction X, the coils 97 and 97' generate in the yokes 95 and 95', magnetic fluxes having directions which are same as that produced by the permanent magnet 96-1, but are opposite to that produced by the permanent magnet 96-2. When the currents are flown in the direction opposite to that shown in FIG. 11A, the above relation is inversed. Therefore, the net amount of the magnetic flux passing through the lens holder 85 made of magnetic material is independent from the direction of currents flowing through the coils 97 and 97' and thus, the lens holder 85 and the objective lens 35 can be moved linearly in accordance with the amount of currents flowing through the coils 97 and 97'. Further, there can be obtained sufficiently large force for driving the lens holder and lens. In this manner the objective lens 35 can be moved in the tracking direction X so as to correct accurately the tracking error by supplying the currents to the coils 97 and 97' in accordance with the detected tracking error signal.

In the embodiment shown in FIGS. 11A and 11B, the magnetic fluids 98 and 98' such as Ferrofluid (trade name of Ferrofluidics Company) are filled in the gaps between the projections 85a and 85a' of the lens holder 85 and the coils 97 and 97', respectively. Since very strong magnetic fields are formed in the gaps, the magnetic fluids 98 and 98' are stably held in the gaps and the efficiency of utilizing the magnetic fluxes can be improved. Further the magnetic fluids serve to provide a desired damping action in the tracking direction X as well as in the focussing direction F.

In the embodiment illustrated in FIGS. 11A and 11B the tracking error is compensated for by moving the objective lens 35 in the tracking direction X. However, it should be noted that the tracking control may be effected by rotating a galvanomirror in accordance with the detected tracking error signal.

Figure 12:
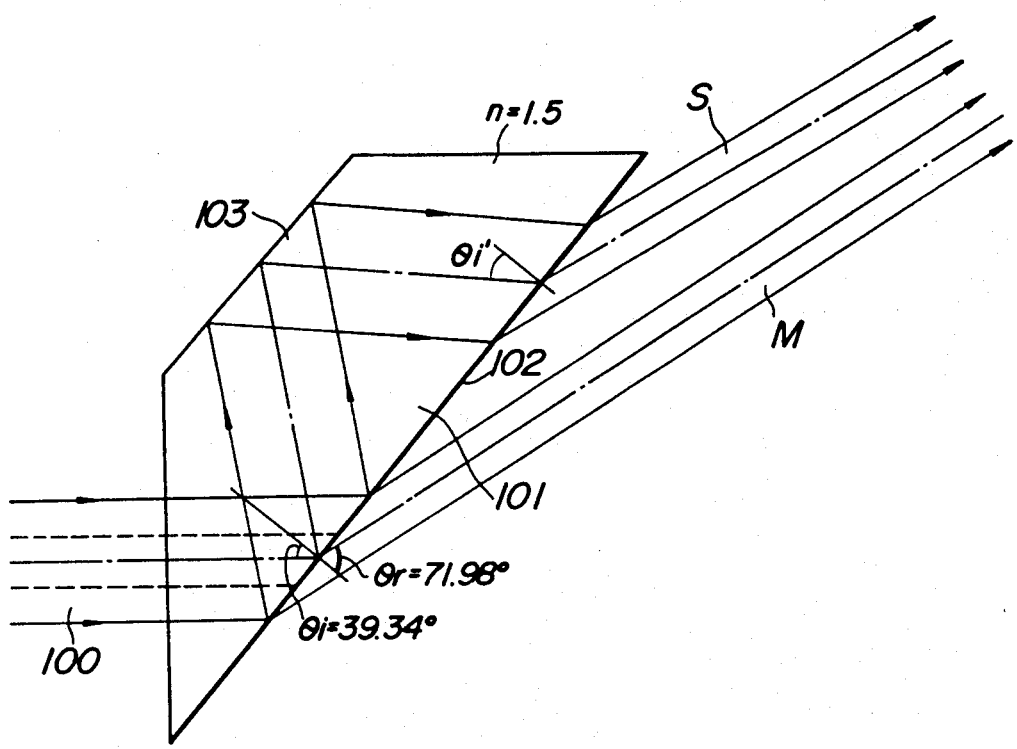
FIG. 12 is a schematic view illustrating an embodiment of an optical system for generating a plurality of beams from a single beam.

In the embodiment shown in FIG. 4, the main and sub beams are generated by the semiconductor laser light source having two light emitting points, but a plurality of beams slightly inclined to each other may be formed from the single beam with the aid of polarizing property of crystal, a grating or a reflection surface set at a critical angle. FIG. 12 shows an embodiment which utilizes the reflection surface set at the critical angle.

In FIG. 12, a reference numeral 100 denotes a parallel light beam having an elliptical cross section, which beam can be obtained from a collimator lens for collimating a diverging light flux having an elliptical cross section emitted by a laser diode. The beam is made incident perpendicularly upon a beam shaping prism 101. In the drawing the beam is drawn as that having an elliptic ratio of 1/2.5 and solid and broken lines represent major and minor axes of an ellipse, respectively.

The elliptical parallel light flux impinges upon a first surface 102 which is set at an angle slightly smaller than a critical angle and thus, a substantial part of the incident flux is refracted by and transmitted through the first surface 102, only a small part is reflected. Now it is assumed that the prism 101 has a refractive index $n=1.5$ and an incident angle $\theta_i$ to the first surface 102 is set to 39.34°. Then a refractive angle $\theta_r$ becomes 71.98° and the elliptic ratio of the transmitted light flux is changed to unity. Therefore, the transmitted light flux has a circular cross section which is used as a main beam M. That is to say, the dimension of the light flux in the direction in the plane of drawing is reduced, but the dimension in the direction perpendicular to the plane of drawing is remained as it is. The light flux reflected by the first surface 102 is fully reflected by a second surface 102 which has a completely reflecting coating and is made again incident upon the first surface 102. The second surface 103 is slightly inclined with respect to the first surface 102, so that the light flux impinges upon the first surface at an incident angle $\theta'_i$ slightly smaller than $\theta_i = 39.34°$. Therefore, the light flux transmitted through the first surface 102 is also changed in a substantially circular beam which is slightly inclined with respect to the main beam M and thus can be used as a sub beam S. If the above explained transmission and reflection are further effected, a plurality of sub beams may be obtained. It should be further noted that the first surface 102 is not always necessary to be set at the angle slightly smaller than the critical angle, but may be constituted by a half mirror.

The present invention is not limited to the embodiments explained above, but may be modified in various ways within the scope of the invention. For instance, the detection prism is not necessary to have the refractive index $n=1.5$, but the prism may be made of material having the refractive index other than 1.5 as long as the incident angle is set at an angle near the critical angle. Further, in the above explained embodiments, use is made of the polarized light, but non polarized light may be effectively used. Moreover, the polarizing prism may be replaced by a half mirror. The present invention may be applied to many information reproducing apparatuses such as an optical magnetic disc player in which a magnetic film such as MnBi is used and the information is recorded thermally.

What is claimed is:

1. A method for reproducing optically an information recorded on a record medium along tracks comprising:

a step of generating at least two light beams;

a step of projecting said light beams onto said record medium by means of an objective lens in such a manner that one of the light beams is positioned on a track to be reproduced and the other beam is situated on the relevant track to be reproduced or another track near the relevant track;

a step of converting each of the light beams reflected by the record medium and collected by said objective lens into a parallel light flux;

a step of separating spatially said light beams from each other by introducing these light beams into an optical member having a reflection surface which is set substantially at a critical angle with respect to one of the beams referred to as a main beam, but at an angle smaller or larger than said critical angle with respect to the other beam referred to as a sub beam;

a step of receiving the thus spatially separated main beam by a first light detector which comprises two bisected light receiving regions to generate an information signal recorded on the relevant track and to generate a focussing error signal of said objective lens with respect to the record medium by detecting a variation in distribution of the main beam impinging upon the light receiving regions; and a step of receiving the spatially separated sub beam by a second light detector to generate a tracking error signal representing a positional deviation of the relevant track and the main beam by detecting a variation in a light amount of the sub beam impinging upon the second light detector.

2. A method for reproducing optically an information recorded on a record medium along track comprising:

a step of generating at least two light beams;

a step of projecting said light beams onto said record medium by means of an objective lens in such a manner that one of the light beams is positioned on a track to be reproduced and the other beam is situated on the relevant track to be reproduced or another track near the relevant track;

a step of converting each of the light beams reflected by the record medium and collected by said objective lens into a parallel light flux;

a step of separating spatially said light beams from each other by introducing these light beams into an optical member having a reflection surface which is set substantially at a critical angle with respect to one of the beams referred to as a main beam, but at an angle smaller or larger than said critical angle with respect to the other beam referred to as a sub beam;

a step of receiving the thus spatially separated main beam by a first light detector which comprises two bisected light receiving regions to generate an information signal recorded on the relevant track and to generate a focusing error signal of said objective lens with respect to the record medium by detecting a variation in distribution of the main beam impinging upon the light receiving regions; and a step of receiving the spatially separated sub beam by a second light detector to generate a tracking error signal representing a positional deviation of the relevant track and the main beam by detecting a variation in a light amount of the main and sub beams impinging upon said first and second light detectors, respectively.

3. A method according to either one of claims 1 and 2, wherein said first light detector is so arranged to receive the main beam reflected by said reflection surface of said optical member and said sub beam is made incident upon said reflection surface at an angle smaller than the critical angle so as to direct the sub beam transmitted through and refracted by the reflection surface toward said second light detector.

4. A method according to either one of claims 1 and 2, wherein said first light detector is so arranged to receive said main beam transmitted through and refracted by said reflection surface and said sub beam is made incident upon the reflection surface at an angle larger than the critical angle so as to direct the sub beam reflected by the reflection surface toward said second light detector.

5. A method according to claim 3, wherein said main beam is positioned at a center of the track, said sub beam is situated at an edge of the relevant track or a track near the relevant track, and said tracking error signal is derived by comparing a light amount of said transmitted sub beam impinging upon said second light detector, with a standard value which corresponds to an amount of the sub beam impinging upon the second light detector when the sub beam is correctly situated at the edge of the track.

6. A method according to claim 2, wherein said main and sub beams are positioned on said relevant track to be reproduced and are deviated from the center of the relevant track symmetrically in a direction perpendicular to the track, and said tracking error signal is derived by detecting a difference in light amounts between the reflected main beam and the transmitted sub beam.

7. A method according to claim 2, wherein said main beam is situated at the center of the relevant track to be reproduced and first and second sub beams are positioned at opposite edges of the track viewed in a direction perpendicular to the track, and said tracking error signal is derived by detecting a difference in light amounts between said first and second sub beams transmitted through and refracted by said reflection surface.

8. A method according to claim 7, wherein said first and second sub beams are positioned at opposite edges of the relevant track to be reproduced.

9. A method according to claim 7, wherein said first and second sub beams are positioned at opposite edges of a track near the relevant track to be reproduced.

10. A method according to claim 7, wherein said first sub beam is positioned at one of edges of a first track near the relevant track to be reproduced and said second sub beam is positioned at one edge of a second track near the relevant track to be reproduced, said one edge of the second track being remote from said one edge of said first track.

11. A method according to claim 7, wherein said first and second sub beams are generated from first and second semiconductor lasers which are driven with driving signals which have the same frequency, but have inversed phases, the first and second sub beams transmitted through and refracted by said reflection surface of the optical member are received by a single second light detector, and said tracking error signal is derived by extracting from an output of said second light detector, frequency components corresponding to said driving signal frequency.

12. A method according to claim 7, wherein said first and second sub beams are generated from first and second semiconductor lasers which are driven with driving signals of different frequencies, the first and second sub beams transmitted through and refracted by said reflection surface of the optical member are received by a single second light detector, and said tracking error signal is produced by deriving a difference in frequency components corresponding to those of said driving signals between said first and second sub beams.

13. A method according to claim 7, wherein said first and second sub beams reflected by the record medium and spatially separated from each other by means of said reflection surface of the optical member are received by two separate light detectors, and said tracking error signal is derived from a difference in outputs supplied from said two light detectors.

14. An apparatus for reproducing optically an information recorded on a record medium along tracks comprising
   beam generating means for generating a single main beam and at least one sub beam;
   an objective lens for converging said main and sub beams and projecting the main and sub beams onto a track to be reproduced and the relevant track or a track near the relevant track, respectively;
   a beam splitting element arranged between said beam generating means and said objective lens for introducing the incident main and sub beams into the objective lens and for emitting the main and sub beams reflected by said record medium and collected by said objective lens toward a direction different from an incident direction;
   an optical member for receiving at least a part of said main and sub beams emitted from said beam splitting element and comprising a reflection surface which is set substantially at a critical angle with respect to a light ray parallel to an optical axis of the main beam reflected by the record medium, but is set at an angle smaller than the critical angle with respect to the sub beam reflected by the record medium;
   means for converting each of said main and sub beams impinging upon said optical member into a parallel light flux when said objective lens and record medium are in a given positional relation relative to each other;
   a first light detecting means comprising a first light detector for receiving the main beam reflected by said reflection surface of the optical member to generate an information signal recorded on the relevant track of the record medium and a focussing error signal of the objective lens relative to the record medium; and
   a second light detecting means comprising a light detector for receiving the sub beam transmitted through and refracted by said reflection surface of the optical member to generate a tracking error signal representing a positional deviation of the main beam and the relevant track.

15. An apparatus according to claim 14, wherein said beam generating means comprises a light source for generating a single light beam and beam splitting means including at least two inclined surfaces for dividing said single beam into said main beam and at least one sub beam.

16. An apparatus according to either one of claims 14 or 15, wherein said first light detector of the first light detecting means comprises two bisected light receiving regions and said focussing error signal is derived by detecting a variation in distribution of the main beam impinging upon said light receiving regions.

17. An apparatus according to either one of claims 14 or 15, wherein said first light detecting means further comprises a second light detector having two bisected light receiving regions for receiving the transmitted main beam, and said focussing error signal is derived by detecting a variation in distribution of the transmitted main beam impinging upon said second light detector.

18. An apparatus according to either one of claims 14 or 15, wherein said first light detecting means further comprises a second light detector for receiving the transmitted main beam, and said focussing error signal is derived by detecting variations in light amounts of said reflected and transmitted main beams.

19. An apparatus according to either one of claims 14 or 15, wherein said tracking error signal is derived by detecting a variation in a light amount of said transmitted sub beam.

20. An apparatus according to either one of claims 14 or 15, wherein said tracking error signal is derived by detecting variations in light amounts of the transmitted sub beam and the reflected main beam.

21. An apparatus according to either one of claims 14 or 15, wherein said means for converting each of the main and sub beams into the parallel light flux comprises a collimator lens arranged between the beam generating means and the beam splitting element.

22. An apparatus according to either one of claims 14 or 15, wherein said means for converting each of the main and sub beams into the parallel light flux comprises a lens arranged between said beam splitting element and said optical member.

23. An apparatus according to either one of claims 14 or 15, wherein said main and sub beams impinging upon the reflection surface of said optical member are P-polarized beams.

24. A device for detecting the degree of convergence and location of at least one light beam on an object having a surface with varying degrees of reflectivity comprising:
   means for projecting at least two light beams at least one of which has a direction which is angled slightly from the direction of at least one other light beam in a fixed positional relationship;
   means for converging said light beams onto an object, said light beams being at least partially reflected from an object back through said converging means;
   means for reflecting a first of said light beams, said reflecting means having surface means positioned substantially at the critical angle of reflection for a light ray of a first light beam passing through the optical axis of said converging means and striking said surface means;
   first means for detecting said first light beam after said first light beam has illuminated said surface means; said converging means being electrically connected to said first detecting means and responsive to signals from said first detecting means so as to enable variance of the degree of convergence of said first light beam in response to the characteristics of illumination of said first detecting means;
   second means for detecting at least a second one of said light beams after said at least a second light beam has illuminated said surface means, said second detecting means being responsive to the degree which said at least a second beam is reflected from said object;

whereby the degree of reflectivity of the portion of an object upon which said at least a second beam illuminates is ascertained at least in part by detecting the degree of illumination of said second detecting means whereupon due to the fixed positional relationship between said at least a second beam and said first beam, information is derived as to the location of said first beam on an object.

25. The device of claim 24 adapted to be utilized on an object which is a record medium having tracks whereupon said first beam is caused to follow a desired predetermined track by utilizing said second detecting means to assist in determining the positional relationship between said at least a second beam and at least one of said tracks, whereby the deviation of said first beam from the desired position relative to a predetermined track is detected at least in part by the degree of illumination of said second detecting means.

26. The device of claims 24 or 25 wherein said first light beam is substantially spatially separated from said at least a second light beam by said surface means in that the first beam is directed onto said surface means substantially at the critical angle and substantially reflected when said converging means is in its optimal position, while said at least a second beam is substantially transmitted through said surface means.

27. The device of claim 26 wherein said reflecting means is a prism positioned at a focal plane of said converging means.

28. The device of claims 24 or 25 further comprising means for positioning said light beams relative to an object, said positioning means being electrically connected to said second detecting means and responsive thereto.

29. The device of claims 24 or 25 wherein said first detecting means comprises first and second sections positioned such that due to the positioning of said surface means when the light rays of said first beam striking said surface means are converging relative to a ray passing through the optical axis of said converging means the illumination of said first section is greater than the illumination of said second section and when the rays of the first beam striking said surface means are diverging relative to a ray passing through the optical axis of said converging means the illumination of said second section is greater than the illumination of said first section whereby the desired degree of convergence by said converging means may be detected by said second detecting means.

30. The device of claim 29 wherein said converging means comprises an objective lens and convergence of said first beam is derived by moving said objective lens further or closer to an object in the direction of the optical axis and the location, of the first beam is derived by moving said objective lens perpendicular to the optical axis.

31. The device of claims 24 or 25 wherein said projecting means includes means for emitting light, and means for splitting light beams positioned in the course of travel of said light between said emitting means and said converging means whereby light illuminating said beam splitting means from said emitting means is directed onto an object and light reflected from an object is directed onto said surface means.

32. The device of claim 31 wherein said beam splitting means is a prism comprising a polarizing surface having a first surface portion which is positioned such that the first light beam is directed onto said object and a second surface portion positioned at an angle to said first surface portion such that said at least second light beam is directed onto an object at an angle to said first light beam.

33. The device of claims 24 or 25 wherein said projecting means comprises a collimator lens.

34. The device of claim 30 further comprising a concave lens positioned between said beam splitting means and said reflecting means, and said projecting means further comprises a convex lens positioned intermediate said emitting means and said beam splitting means whereupon diverging light beams are optimally propagated by said projecting means onto an object and prior to the illumination of said surface means said optimal diverging light beams are converted to parallel light beams by said concave lens.

35. The device of claims 24 or 25 wherein said projecting means comprises a means for emitting light and prism means for beam shaping, said beam shaping prism means including means forming a primary surface positioned at an angle such that only a small portion of the light from said emitting means impringing on said primary surface means is reflected and said first beam is transmitted therethrough and means forming a secondary surface for substantially fully reflecting light reflected from said primary surface means so as to form a second light beam, said secondary surface means being positioned at an angle such that said second light beam is inclined relative to said first light beam.

36. The device of claim 25 wherein there are two light beams and said first and second light beams are positioned on the same track.

37. The device of claim 25 wherein said projecting means projects three light beams onto said record medium, said second and third light beams being positioned during operation at least partially on opposite sides of the desired predetermined track upon which said first beam is positioned, said second detecting means being positioned so as to receive light from said second and third light beams after reflection from a record medium.

38. The device of claim 25 wherein said projecting means generates first, second and third light beams and comprises means forming a first laser means driven at a predetermined frequency and means forming a second laser means driven at the same frequency but having a phase which is the inversion of the phase of said first laser means, said first and second laser means generating said second and third light beams; said second and third light beams both being detected by said second detecting means, said second detecting comprising band pass filter means for extracting a signal having said predetermined frequency and means for phase detecting to separated the signals from said second and third light beams whereupon a positional determination of the location of the first beam is derived from two different inputs into said second detecting means.

39. The device of claim 25 wherein said projecting means generates first, second and third light beams and comprises means forming a primary laser means driven at a first predetermined frequency and means forming secondary laser means driven at a second predetermined frequency, said primary and secondary laser means generating said second and third light beams said second and third light beams both being detected by said second detecting means, said second detecting means comprising first and second band pass filter means for extracting signals of said first and second predetermined frequencies, respectively, and differential amplifier means for comparing the signals transmitted from said first and second band pass filter means;
whereby an indication of any deviation of said first light beam from the desired position relative to a predetermined track is derived from the output of said differential amplifier means.

* * * * *